Feb. 10, 1948.  C. SADOWSKY  2,435,606
TIME-SPEED-DISTANCE DIVIDER-TYPE COMPUTER
Filed Dec. 1, 1943  2 Sheets-Sheet 1
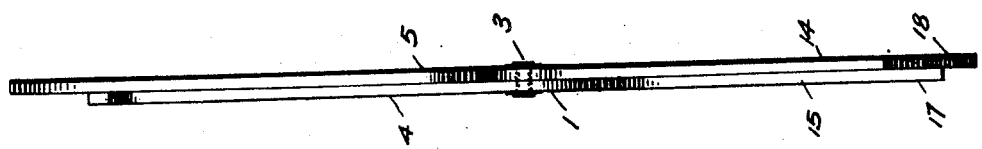
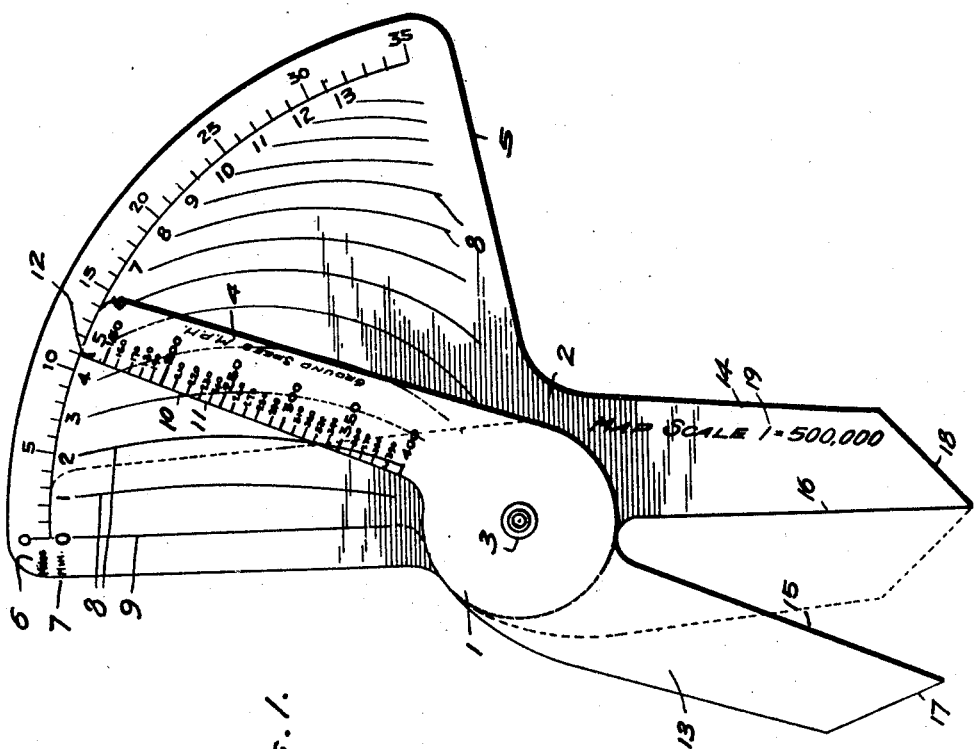
INVENTOR
CHARLES SADOWSKY

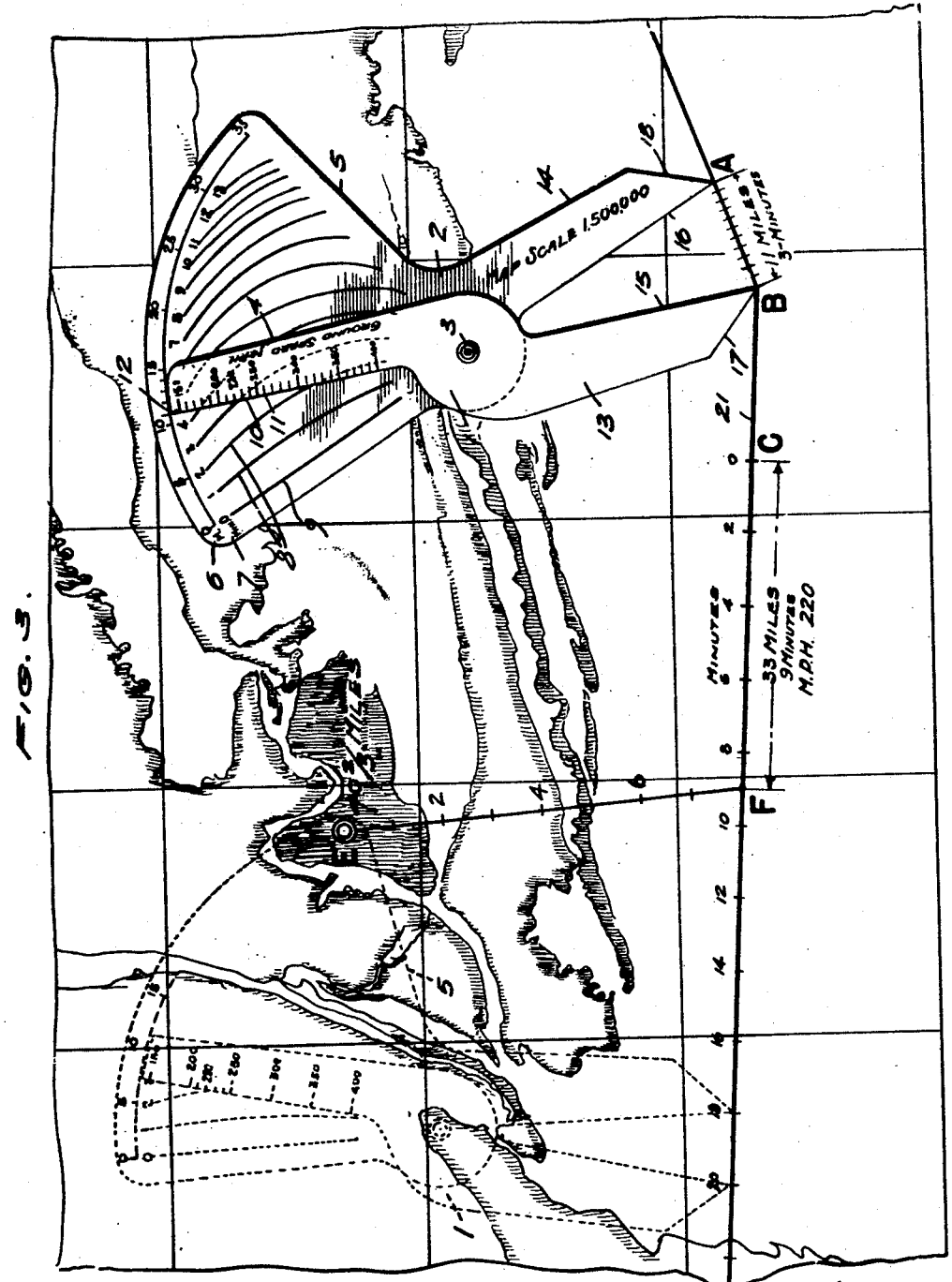

Patented Feb. 10, 1948

2,435,606

UNITED STATES PATENT OFFICE 2,435,606

TIME-SPEED-DISTANCE DIVIDER-TYPE COMPUTER

Charles Sadowsky, New York, N. Y.

Application December 1, 1943, Serial No. 512,446

3 Claims. (Cl. 33—148)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a computer for determining either the flight time, ground speed or the distance between given points along a flight path whenever any two of the required factors are known.

An object of the invention is to provide a time-speed-distance computing device which is simple and inexpensive in construction, extremely easy to use, and accurate in result; the setting of the device to the given factors requiring but one operation and instantly giving the desired answer.

Another object of the invention is to provide a simple and easily manipulated device for use with a map, as when solving problems of aircraft interception, in timing enemy flights between plotted points on the map and thereby compensating for and checking errors in reports as to the position of the enemy aircraft to be intercepted and the time of passing over certain places.

The objects and advantages of the device will be apparent from the following detailed description of a specific embodiment of the invention and from the accompanying drawing, wherein:

Figure 1 is a face view of the computer;

Figure 2 is an edge view thereof; and

Figure 3 is a schematic view illustrating the use of the device with a map.

In the form shown, the computer consists of a pair of scale-bearing members 1 and 2, of stiff cardboard, metal or other suitable material, pivotally connected, as at 3, for relative movement, one above the other. Each member comprises an upper scale-bearing portion and a lower leg-portion; the scale-bearing portion 4 of member 1 being a radial arm or cursor adapted to be moved across the scale-bearing portion 5 of member 2 by the opening and closing of the legs of the computer. The scale-bearing portion 5 of member 2 is elongated in the direction of movement of the cursor 4, preferably being sector-shaped as illustrated.

The sector 5 is provided with an arcuate distance scale 6 and a time scale 7, the distance scale preferably being located adjacent the arcuate edge of the sector immediately above the end of the cursor 4 and the time scale being disposed inwardly of the distance scale in position to be traversed by the cursor 4. The distance scale 6 is concentric with the pivot 3 and is graduated in miles over a range of the thirty-five miles; the scale divisions being numbered from left to right at intervals of five miles. The time scale 7 comprises a series of time curves 8 numbered from zero to 13 to represent minutes of time. The distance scale and the time scale have their zero marks on the radial zero line 9 of the sector 5 with which the radial edge 10 of the cursor 4 is aligned when the legs of the computer are closed, as shown in the dotted line construction of Figure 1. Obviously, scales of larger or smaller ranges than is illustrated may be used if found necessary or desirable.

A ground speed scale 11 for speeds of 150 miles per hour to 400 miles per hour is provided on the cursor 4 adjacent the radial edge 10 and is adapted to be read in connection with the time lines of scale 7 for ascertaining either the time or the ground speed required to traverse the distance represented by the spacing of the legs; the required answer being read on the scale containing the unknown factor and at that line thereof which is intersected by the line of the other scale representing the known factor. The actual distance, in miles or fraction thereof, is indicated on the distance scale 6 by an index mark or pointer, such as an arrow head 12, at the outer extremity of the radial edge 10 of the cursor.

The leg portions 13 and 14 of the members 1 and 2 have straight confronting edges 15 and 16, respectively. These edges are correlated with the zero line 9 and the graduated edge 10 of the scale-bearing portions 4 and 5 of the computer so that when the computer is set to zero, i. e. when the edge 10 of the cursor 4 coincides with the zero line 9 of the sector 5, the legs are closed with the straight edges 15 and 16 meeting along a line radially below the pivot 3 and forming a straight angle with the zero line 9. The legs 13 and 14 are pointed at their lower extremities, as indicated at 17 and 18, for accurate placement over or alignment with selected spaced points the distance or flight time between which is to be ascertained. The leg 14 bears a legend 19 reading "map scale 1:500,000" indicating the scale of the map or chart with which the computer is designed to be used. The computer may be constructed to larger or smaller scale, as desired.

The device functions both as a distance indicator for indicating the mileage between selected points and as a timer for indicating the flight time over a given distance at a known rate of speed. It is especially useful in measuring or timing map distances. Its utility and advantages in this connection, particularly for determining flight time and distances quickly and accurately when solving air interception problems, will be observed from Figure 3 of the drawing wherein is shown a portion 20 of an intercept map to the same scale as the computer. The successive positions and flight path of the enemy aircraft to be intercepted are plotted on the map 20 in accordance with reports received from outlying spotter stations as to the position and time of passage of the enemy aircraft over these stations. The plotted flight path of the enemy aircraft is represented on the map 20 by the line 21 and the successive positions at the points marked A, B, C and D. In timing enemy flight between selected points, such as the points A and B, the computer is placed on the map as shown in full lines to the right of the figure with the legs 13 and 14 spread apart so that the end 17 of the computer leg 13 coincides with the point B while the end 18 of the computer leg 14 coincides with the point A. The ground speed of the enemy aircraft being given or previously determined as 220 miles per hour, the required flight time is indicated on the computer by the curve of the time scale 7 intersected by the graduation numbered 220 on the speed scale and is found to be 3 minutes. The actual distance in miles between the points A and B is read from the distance scale 6 in accordance with the position of the arrow head 12 relative to the distance graduations of the scale and is indicated as being 11 miles. It is evident also that the ground speed of the enemy flight between successive plots, if unknown, can be instantly determined without calculation by applying the computer to the plots in the manner just described. Thus, if the enemy aircraft is observed above A at a given time and is reported as being observed three minutes later at B, the appropriate time interval line, numbered 3 on the time scale 7, is read back to its intersection with the speed scale 11 at which point the ground speed reading is found to be 220 miles per hour.

The point E on the map represents the location or point or departure of the interceptor aircraft and the straight portion of the line 21 connecting points C and D represents the plotted course of the enemy aircraft projected from point C in the direction determined from analysis of the received reports and succeeding plots of the enemy flight between points A and C. Since the point of interception F is that point on the enemy flight path at which the flight time of the interceptor aircraft from point E compares favorably with the flight time of the enemy aircraft from point C, the provision of marks along the course line representing time intervals of distance to the scale of the map at the given ground speed will facilitate the determination of the point and the time at which interception will take place. The computer provides a convenient and handy means for marking off the ground speed in time intervals of distance from one to thirteen minutes. Thus, by setting the computer so that the graduation numbered 220 on the speed scale 11, representing the given ground speed, intersects the 2-minute curve on the time scale 7, the legs of the computer will be spaced apart at the pointed ends 17 and 18 a distance representing two minutes of travel time at the given rate of speed. With the computer held to this setting, the spaced points 17 and 18 are applied to the course line connecting points C and D and their relative positions indicated by suitable marks 22. By marking off successive positions of the computer, the distance between points C and D will be divided into equal parts, each representing two minutes of travel time across the distance between the marks. These marks may be consecutively numbered, beginning with zero at point C, to indicate the resultant flight time from point C to the point of interception F.

Other uses and advantages of the computer will be apparent from the foregoing description and it is to be understood that the invention is not restricted to the precise embodiment herein shown and described but may be modified and changed within the scope of the appended claims.

Having thus described my invention what I claim is:

1. A computer comprising a pair of manually adjustable members consisting respectively of an opaque scale-bearing portion and a pointed leg portion and connected together for relative sliding movement of the scale-bearing portions one across the other for varying the spacing between the leg portions, the scale-bearing portion of one member having a distance scale and a set of time curves arranged thereon to be traversed by the scale-bearing portion of the other member, and the scale-bearing portion of the other member being provided with an index for indicating on the distance scale a distance value proportionate to the spacing of the legs of the computer and having also a speed scale with graduations arranged to intersect the time curves at relatively different points when moved thereacross by the opening and closing of the legs for indicating speed and time factors directly proportional to the indicated distance value.

2. A divider-type computer for use with a map for determining either the flight time or the ground speed or the distance between given spaced points on the map whenever any two of the three required factors are known, comprising two members pivoted together intermediate their extremities for relative sliding movement one across the other, the extremities of the members at one side of the pivot being pointed for placement over the given spaced points on the map, one of the said members being provided on the opposite side of the pivot with an opaque scale-bearing sector having an arcuate distance scale concentric with the pivot, and a set of time curves extending obliquely of the sector, the other member of the computer having an opaque radial arm portion provided with an index for indicating on the distance scale the value corresponding to the distance represented by a given spacing between the pointed extremities of the members and having a ground speed scale arranged thereon to be read in connection with the intersections therewith of the time curves for indicating speed and time factors directly proportional to the represented distance.

3. A divider-type computer for use with a map comprising a pair of members pivotally connected together for relative movement and respectively consisting of an opaque scale-bearing portion and a leg portion, each leg portion being sharp pointed for accurate placement over or alignment with a selected point on the map, the scale-bearing portion of one member having a set of time curves arranged thereon to be traversed by the scale-bearing portion of the other member, the scale-bearing portion of the said other member having a ground speed scale thereon so as to be moved across the time curves by the opening and closing of the legs of the computer whereby the point of intersection of any given time curve and speed scale graduation varies for different open positions of the computer legs, one of said members having a scale of distance values, and an index on the other member for indicating on the distance scale the value corresponding to the actual distance represented by the spacing between the legs of the computer.

CHARLES SADOWSKY.

REFERENCES CITED

The following references are of record in the file of this patent:

UNITED STATES PATENTS

| Number | Name | Date |
|---|---|---|
| 1,528,944 | Newell | Mar. 10, 1925 |

FOREIGN PATENTS

| Number | Country | Date |
|---|---|---|
| 20,093 | Switzerland | 1898 |